United States Patent
Bauerle

(10) Patent No.: US 8,112,212 B2
(45) Date of Patent: Feb. 7, 2012

(54) VEHICLE BRAKE CONTROL BASED ON LEARNED VEHICLE MASS

(75) Inventor: Paul A. Bauerle, Fenton, MI (US)

(73) Assignee: GM Global Technology Operations LLC

( * ) Notice: Subject to any disclaimer, the term of this patent is extended or adjusted under 35 U.S.C. 154(b) by 728 days.

(21) Appl. No.: 12/197,533

(22) Filed: Aug. 25, 2008

(65) Prior Publication Data

US 2010/0049415 A1    Feb. 25, 2010

(51) Int. Cl.
*B60T 8/172* (2006.01)
*B60T 8/18* (2006.01)

(52) U.S. Cl. .......................................................... 701/70

(58) Field of Classification Search .................. None
See application file for complete search history.

(56) References Cited

U.S. PATENT DOCUMENTS

| | | | |
|---|---|---|---|
| 5,178,441 A | 1/1993 | Heibel et al. | |
| 5,707,117 A | 1/1998 | Hu et al. | |
| 6,056,374 A | 5/2000 | Hiwatashi | |
| 6,099,085 A | 8/2000 | Eckert | |
| 6,226,586 B1 * | 5/2001 | Luckevich et al. | 701/70 |
| 6,273,522 B1 | 8/2001 | Feetenby et al. | |
| 6,293,632 B1 | 9/2001 | Grote et al. | |
| 6,390,565 B2 | 5/2002 | Riddiford et al. | |
| 6,438,510 B2 | 8/2002 | Zhu et al. | |
| 6,625,535 B2 | 9/2003 | Han et al. | |
| 7,805,232 B2 * | 9/2010 | Karnjate et al. | 701/70 |
| 2009/0055064 A1 * | 2/2009 | Lin | 701/70 |

FOREIGN PATENT DOCUMENTS

| | | |
|---|---|---|
| DE | 19726116 A1 | 1/1999 |
| DE | 10137273 A1 | 4/2002 |
| DE | 102007028000 | 12/2007 |
| EP | 0435113 A1 | 7/1991 |
| EP | 1291258 A1 | 3/2003 |

* cited by examiner

*Primary Examiner* — Michael J. Zanelli

(57) ABSTRACT

A control system for a vehicle brake comprises a compensation module that determines a compensated brake value based on a vehicle mass and at least one of a pedal force and a pedal displacement, and a brake control module that selectively adjusts a fluid pressure supplied to the vehicle brake based on the compensated brake value. The compensation module determines the compensated brake value based on a comparison of the vehicle mass and a predetermined mass value. A related method for controlling the vehicle brake based on vehicle mass is also provided.

8 Claims, 3 Drawing Sheets

VEHICLE BRAKE CONTROL BASED ON LEARNED VEHICLE MASS

FIELD

The present disclosure relates to control of a motor vehicle, and more particularly, control systems and methods for controlling brakes of the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that includes a powerplant (e.g., an engine, an electric motor, and/or a combination thereof), a multispeed transmission, and a differential or final drive train. The powerplant produces drive torque that is transmitted through one of various gear ratios of the transmission to the final drive train to drive wheels of the vehicle.

Motorized vehicles may also include brakes connected to the wheels that may be selectively actuated to decelerate and thereby stop the vehicle. Typically, the brakes are operated by a driver of the vehicle by depressing a brake pedal and thereby generating a pedal force. In vehicles equipped with a hydraulic brake system, the pedal force may be converted to a pressure of brake fluid used to actuate the brakes (hereinafter "brake apply pressure") via a master cylinder included with the hydraulic brake system.

The brake apply pressure may be used to actuate the chassis brakes and thereby generate a brake torque used to decelerate the vehicle. In a conventional brake system, the pedal force may be directly transmitted to the master cylinder for generating the brake apply pressure. Conventional power brake systems may include a brake booster that amplifies the pedal force transmitted to the master cylinder and thereby provides braking assistance.

Alternatively, in a brake-by-wire system, the pedal force may be indirectly transmitted to the chassis brakes via the hydraulic brake system by an actuator connected to the master cylinder. The actuator may be regulated by one or more control modules to produce a desired brake torque based on a driver intended braking force. The brake-by-wire system may include a sensor that measures a displacement of the brake pedal. The brake-by-wire system may also include a sensor that measures the pedal force. One or more of the foregoing sensors may be used by the brake-by-wire system to determine the driver intended braking force. Based on the driver intended braking force, the brake-by-wire system may regulate the actuator to generate the brake apply pressure corresponding to the desired brake torque.

The brake apply pressure may be modified for a variety of reasons. For example, anti-lock braking systems may modify brake apply pressure to inhibit wheel slip that may occur on slippery or uneven roads. Similarly, vehicle stability control systems may modify brake apply pressure by apportioning the brake apply pressure among the wheels to inhibit a loss of vehicle control.

SUMMARY

In one aspect, the present disclosure provides a control system for a vehicle brake comprising a compensation module that determines a compensated brake value based on a vehicle mass and at least one of a pedal force and a pedal displacement, and a brake control module that selectively adjusts a fluid pressure supplied to the vehicle brake based on the compensated brake value. In one feature, the compensation module determines the compensated brake value based on a comparison of the vehicle mass and a predetermined mass value, and when the vehicle mass is greater than the predetermined mass value, the brake control module adjusts the fluid pressure in proportion to a quotient of the vehicle mass and the predetermined mass value. In another feature, the compensation module determines the compensated brake value based on a negative drive torque produced by a powerplant.

In one exemplary embodiment, the control system further comprises an actuator that selectively supplies an actuation force to a master cylinder that generates the fluid pressure in response to the actuation force, and the brake control module adjusts the actuation force. In another exemplary embodiment, the control system further comprises a brake pedal mechanically coupled to a master cylinder, the brake pedal selectively operable to supply a pedal force to the master cylinder, and an actuator that supplies an actuation force to the master cylinder, wherein the master cylinder generates the fluid pressure in response to the pedal force and the actuation force, and wherein the brake control module adjusts the actuation force.

In another aspect, the present disclosure provides a method for controlling a vehicle brake comprising determining a compensated brake value based on a vehicle mass and at least one of a pedal force and a pedal displacement, and selectively adjusting a fluid pressure supplied to the vehicle brake based on the compensated brake value. In one feature, the determining the compensated brake value includes comparing the vehicle mass and a predetermined mass value, and when the vehicle mass is greater than the predetermined mass value, the selectively adjusting the fluid pressure includes adjusting the fluid pressure in proportion to a quotient of the vehicle mass and the predetermined mass value.

In another feature, the determining the compensated brake value includes determining the compensated brake value based on a negative drive torque produced by a powerplant. In yet another feature, the method further comprises providing an actuator that selectively supplies an actuation force to a master cylinder that generates the fluid pressure in response to the actuation force, wherein the selectively adjusting the fluid pressure includes adjusting the actuation force.

In still another feature, the method further comprises providing a brake pedal mechanically coupled to a master cylinder, the brake pedal selectively operable to supply a pedal force to the master cylinder, and providing an actuator that supplies an actuation force to the master cylinder, wherein the master cylinder generates the fluid pressure in response to the pedal force and the actuation force, wherein the selectively adjusting the fluid pressure includes adjusting the actuation force.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
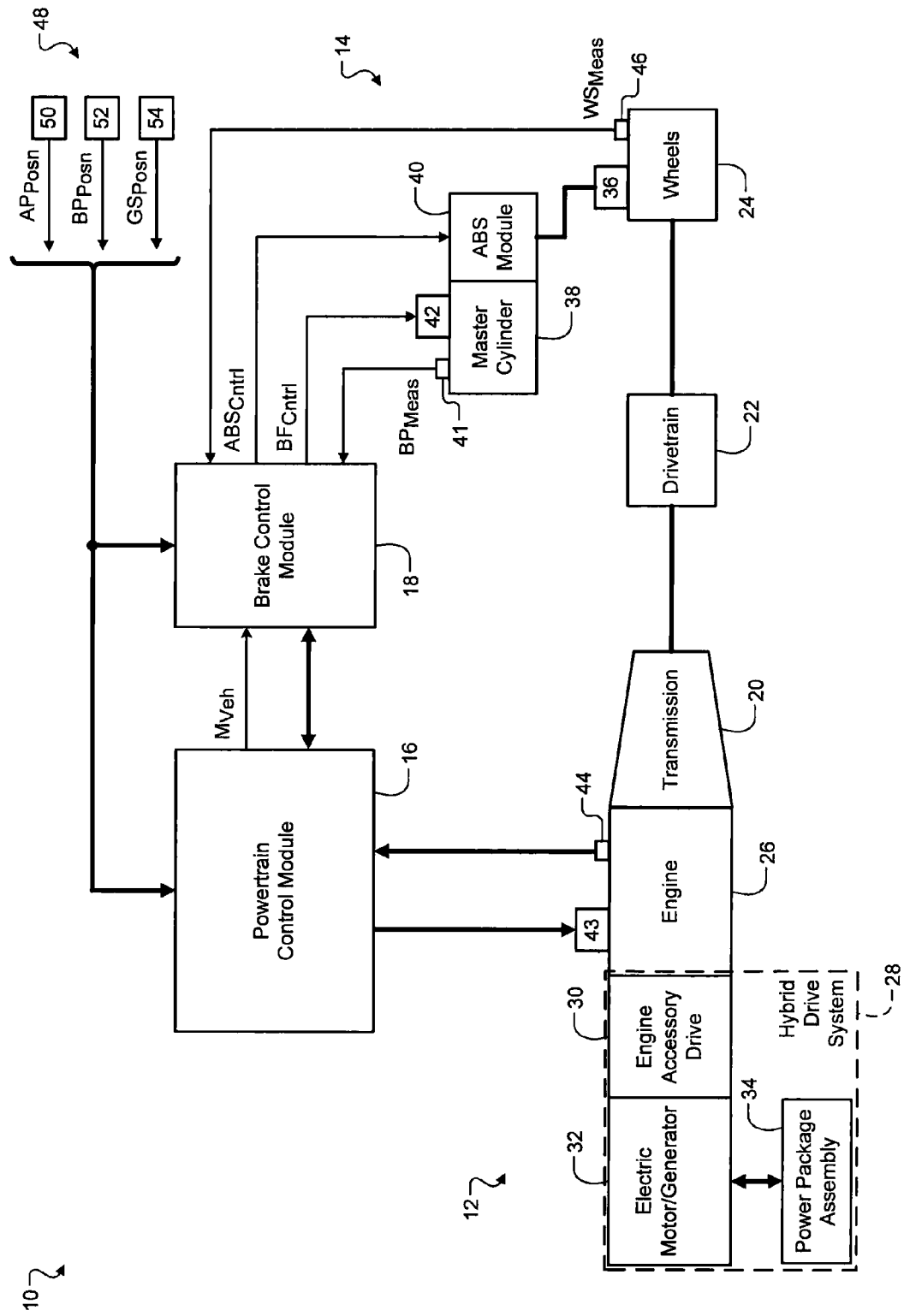
FIG. 1 is a functional block diagram illustrating an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vehicle brake performance may be affected in a variety of ways. For example, braking performance may be reduced by heat generated during prolonged braking. Additionally, braking performance may be affected by changes in vehicle mass. Increases in vehicle mass may reduce braking performance by requiring additional brake pedal travel and/or pedal force to generate the additional energy required to decelerate and/or stop the loaded vehicle. Vehicle mass may vary, depending on the number of passengers and cargo loaded in the vehicle.

Accordingly, the present disclosure provides a control system and method for regulating the brakes based on vehicle mass. Under the principles of the present disclosure, additional brake apply pressure may be supplied to the brakes in proportion to vehicle mass. The vehicle mass may be a learned value as discussed herein, or may be a value input by the driver of the vehicle.

By adjusting the brake apply pressure based on vehicle mass, the perceived brake performance by the driver of the vehicle may be enhanced by reducing the amount of pedal travel and/or force required to meet the driver's braking intent. Additionally, actual brake performance may be enhanced by increasing vehicle deceleration to meet the driver's braking intent. In the foregoing manner, brake feel and performance may be improved.

With particular reference to FIG. 1, a partial schematic illustration of an exemplary vehicle system 10 according to the principles of the present disclosure is shown. The vehicle system 10 includes a powerplant 12 and a brake system 14. The powerplant 12 and the brake system 14 may be regulated by a powertrain control module (PCM) 16 and a brake control module 18, respectively. As discussed in further detail below, the PCM 16 and the brake control module 18 work together to regulate the brake system 14 based on vehicle mass.

The powerplant 12 produces drive torque that may be used to accelerate the vehicle and maintain a desired vehicle speed. The drive torque may be transferred through a transmission 20 at varying gear ratios to a drivetrain 22 to drive at least one or more wheels 24 of the vehicle. The powerplant 12 may also be used to decelerate the vehicle by allowing the wheels to back drive the powerplant 12 via the transmission 20 and drivetrain 22.

The powerplant 12 may be a hybrid powerplant that includes an internal combustion engine 26 and a hybrid drive system 28 as shown. The hybrid drive system 28 may be one of several types and may be a belt alternator starter system (BAS). Accordingly, the hybrid drive system 28 may include an engine accessory drive 30, an electric motor/generator 32, and a power package assembly 34.

The engine accessory drive 30 transfers torque between the engine 26 and the electric motor/generator 32. In a motoring mode, the motor/generator 32 provides drive torque to the engine 26 while receiving electrical power from power package assembly 34. In a regenerating mode, the motor/generator 32 supplies an electrical charge to power package assembly 34 while being driven by the engine 26. The power package assembly 34 includes a battery (not shown) that stores energy supplied by the motor/generator 32 and supplies the energy to the various components of the vehicle system 10, including the motor/generator 32.

With continued reference to FIG. 1, the brake system 14 is connected to the wheels 24 and produces brake torque that may be used to decelerate and thereby stop the vehicle. The brake system 14 may be a brake-by-wire system as discussed herein. Alternatively, the brake system 14 may be of the conventional mechanical type. The brake system 14 may include hydraulically-actuated brake assemblies 36 connected to the wheels 24. The brake assemblies 36 may be friction brakes that produce the brake torque in proportion to a pressure of brake fluid (i.e. brake apply pressure) supplied to the brake assemblies 36.

The brake system 14 may further include a master cylinder 38 and a brake modulator, such as anti-lock brake (ABS) module 40. The master cylinder 38 supplies brake fluid under pressure to the ABS module 40, which in turn supplies the brake fluid at the desired brake apply pressure to the brake assemblies 36. The master cylinder 38 supplies the brake fluid at a working pressure in proportion to a variable external force applied to the master cylinder 38. The master cylinder 38 may include a pressure sensor 41 that senses the working pressure and generates a pressure signal ($BP_{Meas}$) that may be used to determine the working pressure. The pressure signal, $BP_{Meas}$, may be output to the brake control module 18.

The external force may be supplied to the master cylinder 38 via an electro-mechanical actuator assembly 42 included with the brake system 14. The actuator assembly 42 may be regulated to vary the external force supplied to the master cylinder and thereby vary the working pressure supplied by the master cylinder 38. For example, the actuator assembly 42 may supply a desired external force based on a brake control signal ($BF_{Cntrl}$) generated by the brake control module 18. The actuator assembly 42 may be regulated to supply the desired external force required to generate the desired working pressure as discussed herein. Alternatively, in a conventional brake system, the actuator assembly 42 may be regulated to supply an external force to the master cylinder 38 supplement pedal force. The actuator assembly 42 may be regulated to generate the desired working pressure supplied by the master cylinder 38. The actuator assembly 42 may include a vacuum-operated booster (not shown) that amplifies the force supplied by the actuator assembly 42.

The ABS module 40 receives the brake fluid at the working pressure and, in turn, selectively supplies brake fluid to the brake assemblies 36 at the desired brake apply pressure. The ABS module 40 may also modulate the brake apply pressure supplied to one or more of the brake assemblies 36 as may be desired. Modulation of the brake apply pressure may be desired to regulate wheel slip. The ABS module 40 may also bias or apportion the brake apply pressure among the individual wheels 24 (e.g., front and rear wheels) of the vehicle.

The PCM 16 may regulate various actuators 43 included with the vehicle system 10 and thereby regulate the drive torque produced by the powerplant 12. For simplicity, a single actuator 43 located at the engine 26 is shown. The actuators 43 may include, for example, a throttle valve (not shown) for regulating an intake air of the engine 26. The PCM 16 may regulate the drive torque based on signals it receives from various vehicle sensors included with the vehicle system 10. For brevity, only engine sensors 44 and a wheel speed sensor 46 are shown. The PCM 16 may further regulate the drive torque based on signals generated in response to driver input to driver interface devices 48. While only certain vehicle sensors and actuators are discussed herein, it will be appreciated that the vehicle system 10 may include other sensors and actuators located throughout the vehicle system 10 as may be desired.

The sensors 44 may include sensors such as, but not limited to, a mass air flow sensor (not shown) and a coolant temperature sensor (not shown) located in the engine 26. Signals generated by the sensors 44 may be output to the PCM 16. The wheel speed sensor 46 may be located at one of the wheels 24 and may generate a wheel speed signal ($WS_{Meas}$) that may be used to determine a current speed of the vehicle. The wheel speed sensor 46 may output the wheel speed signal, $WS_{Meas}$, to the brake control module 18.

The driver interface devices 48 may include, but are not limited not limited to, an accelerator pedal 50, a brake pedal 52, and a transmission gear selector 54. The accelerator pedal 50 may generate an accelerator pedal signal ($AP_{Posn}$) indicating a position of the accelerator pedal 50 that may be used to determine a driver intended drive torque. The brake pedal 52 may generate one or more signals that may be used to determine a driver intended brake torque. For example, the brake pedal 52 may generate a brake pedal signal ($BP_{Posn}$) indicating a position and/or a displacement of the brake pedal 52. The brake pedal 52 may also generate a signal (not shown) indicating a pedal force exerted on the brake pedal 52 by the driver. The gear selector 54 may generate a gear selector signal ($GS_{Posn}$) indicating a position of the gear selector 54 that may be used to determine a driver intended operating range (e.g., park, reverse, neutral, drive, etc.) of the transmission 20. The signals generated by the interface devices 48 may be output to the PCM 16 and brake control module 18 as shown.

The brake control module 18 may regulate the various components of the brake system 14, such as the actuator assembly 42 and the ABS module 40, and thereby regulate the brake torque produced by the brake assemblies 36. The brake control module 18 may generate control signals, such as a brake force control signal ($BF_{Cntrl}$) and an ABS control signal ($ABS_{Cntrl}$) for regulating the actuator assembly 42 and ABS module 40, respectively. The brake control module 18 may regulate the brake torque based on signals it receives from various sensors of the vehicle system 10 previously described herein, such as the wheel speed sensor 46 and pressure sensor 41.

Under the principles of the present disclosure, the PCM 16 and the brake control module 48 may work together to regulate the brake torque generated by the brake system 14 based on a learned vehicle mass ($M_{Veh}$). More specifically, the PCM 16 and brake control module 48 may work together to selectively adjust the brake torque generated by the brake system in proportion to the learned vehicle mass, $M_{Veh}$. In this manner, the PCM 16 and brake control module 18 may work together to provide braking assistance to meet the driver intended brake torque.

Figure 2:
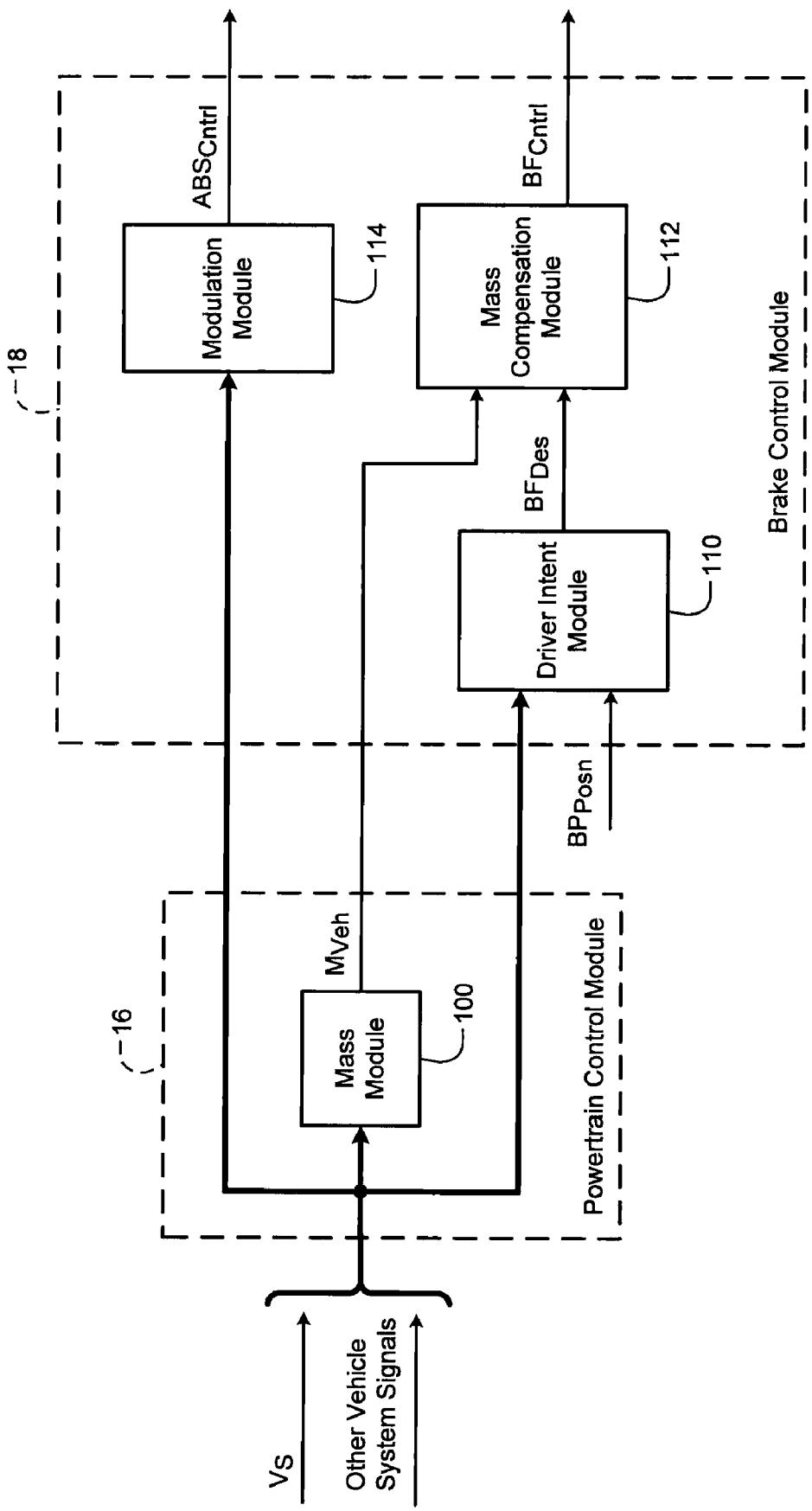
FIG. 2 is a partial functional block diagram of the powertrain control module and brake control module shown in FIG. 1.

With particular reference to FIG. 2, the PCM 16 may include a mass module 100 that determines the learned vehicle mass ($M_{Veh}$). The mass module 100 may output $M_{Veh}$ to the brake control module 18 as shown. The learned vehicle mass, $M_{Veh}$, is an estimated total mass of the vehicle. Thus, $M_{Veh}$ generally includes the mass of passengers, cargo, and trailer weight, as well as the mass of all operating consumables, such as motor oil, coolant, and the fuel used to power the vehicle. The mass module 100 may determine the learned vehicle mass in a recursive manner to account for changes in the total mass of the vehicle over time. Further, the mass module 100 may estimate $M_{Veh}$ by any known methods.

For example, some known methods use pressure sensors or switches that measure loads and/or displacements of the vehicle. The sensors or switches may be located at the passenger compartment (e.g., seats), cargo area, chassis, and/or trailering hitch. Other known methods use Newton's second law of motion to determine vehicle mass. Newton's second law provides that the sum of the forces on the vehicle must be equal to the product of vehicle mass and the resultant acceleration (or deceleration). Accordingly, such methods may use recursive methods to determine a quotient of a net sum of vehicle push forces and vehicle acceleration. The vehicle push forces may include, for example, propulsion forces, braking forces, aerodynamic forces, and road grade forces. Each of the vehicle push forces may be estimated using one or more of drive torque, brake torque, and vehicle speed. Vehicle acceleration or deceleration may be estimated using a time rate of change in wheel speed or changes in vehicle position over time as sensed by a global positioning system.

The brake control module 18 may include a driver intent module 110, a mass compensation module 112, and a modulation module 114. The driver intent module 110 determines the driver intended brake torque ($BF_{Des}$) and outputs the value of $BF_{Des}$ to the mass compensation module 112. The driver intent module 110 may determine $BF_{Des}$ based on the brake pedal sensor signal, $BP_{Posn}$, and other vehicle system signals as may be desired. In general, $BF_{Des}$ will be equal to the driver intended brake torque indicated by driver input to the brake pedal 52. Where the vehicle system 10 is operating in a particular mode, such as a powertrain braking mode or the regenerating mode of the hybrid system 28, that is generating negative drive torque, $BF_{Des}$ may be equal to the driver intended brake torque indicated by the driver minus an estimated value for the negative drive torque.

The mass compensation module 112 determines the compensated brake torque ($BF_{Comp}$) based on the learned vehicle mass, $M_{Veh}$, and the driver intended brake torque, $BF_{Des}$ values it receives. Additionally, the mass compensation module 112 outputs the brake control signal, $BF_{Cntrl}$, to the actuator assembly 42 to regulate the brake assemblies 36 to produce brake torque equal to the compensated brake torque, $BF_{Comp}$.

In general, the mass compensation module 112 determines $BF_{Comp}$ in proportion to a quotient of $M_{Veh}$ and a minimum vehicle mass value ($M_{Min}$). The minimum vehicle mass value, $M_{Min}$, may be a predetermined mass value stored in memory (not shown) of the brake control module 18 and may be a calibratable value. The value of $M_{Min}$ may be equal to a curb weight of the vehicle. In other words, $M_{Min}$ may be a predetermined value equal to the total weight of the vehicle with standard equipment, all necessary operating consumables, a full tank of fuel, and not loaded with passengers, cargo, or trailer weight.

Alternatively, the minimum vehicle mass value, $M_{Min}$, may be a threshold vehicle mass greater than the curb weight of the vehicle. In this manner, $M_{Min}$, may be a threshold vehicle mass below which mass-compensated braking assistance is inhibited. The value of $M_{Min}$ may be equal to the curb weight plus a mass offset value. The mass offset value may be an estimated mass of one or more expected passengers of the vehicle. As another example, the mass offset value may be equal to an estimated mass of certain optional equipment that, while not originally installed by the manufacturer of the vehicle, may be installed in the vehicle later.

With the foregoing in mind, where $M_{Veh}$ is greater than $M_{Min}$ the mass compensation module 112 may determine $BF_{Comp}$ using the formula: $BF_{Comp}=BF_{Des}*(M_{Veh}/M_{Min})$ [equation 1a]. Where $M_{veh}$ is less than or equal to $M_{Min}$, the mass compensation module may determine $BF_{Comp}$ using the formula: $BF_{Comp}=BF_{Des}$ [equation 2]. In this manner, the mass compensation module 112 may selectively use equations 1a and 2 to ensure $BF_{Comp}$ is greater than or equal to $BF_{Des}$ and $BF_{Comp}$ will not result in decreased brake performance.

An additional term, $(1-k)$, may be added to equation 1a to scale the value of the $M_{Veh}/M_{Min}$ term, yielding the following equation: $BF_{Comp}=BF_{Des}*(M_{Veh}/M_{Min})*(1-k)$ [equation 1b]. In equation 1b, k may be a real numerical value that varies between zero and one (i.e. $0.0 \leq k \leq 1.0$). The value of k may be varied as desired to scale the value of $M_{Veh}/M_{Min}$. Scaling the $M_{Veh}/M_{Min}$ term may be desired to enable the vehicle system 10 to operate in one or more modes, such as the powertrain braking mode or the regenerating mode, to generate negative drive torque to assist braking.

For example, scaling the $M_{Veh}/M_{Min}$ term according to equation 1b may enable the vehicle system 10 to generate negative drive torque proportional to $BF_{Comp}*(k)$. In this manner, equation 1b enables mass-compensated braking assistance to be provided through a combination of additional brake torque generated by the brake assemblies 36 and negative drive torque generated by the powerplant 12. Using equation 1b, the distribution of braking assistance between the brake assemblies 36 and the powerplant 12 may be varied by varying the value of k. The mass compensation module 112 may also selectively use equations 1b and 2 to determine $BF_{Comp}$.

Alternatively, $BF_{Comp}$ may be calculated using the formula: $BF_{Comp}=BF_{Des}*(M_{Veh}/M_{Min})*(1-q)+BF_{Des}*(q)$ [equation 1c]. In equation 1c, q may be a real numerical value that varies between zero and one (i.e. $0.0 \leq q \leq 1.0$). The value of q may be a predetermined value or may be varied as desired to scale the value of the terms in equation 1c. Scaling the terms according to equation 1c may be desired to gradually introduce mass-compensated braking assistance where the learned vehicle mass, $M_{Veh}$, has increased significantly and/or mass-compensated braking assistance was not previously provided. For example, as q is varied from one to zero in equation 1c, the amount of mass-compensated braking assistance varies from zero to an amount proportional to $M_{Veh}$. The mass compensation module 112 may also selectively use equations 1c and 2 to determine $BF_{Comp}$.

The modulation module 114 generates a modulation signal ($ABS_{Cntrl}$) that is output to the ABS module 40 to generate the brake apply pressure supplied to the brake assemblies 36. More specifically, the modulation module 114 generates $ABS_{Cntrl}$ to modulate the brake apply pressure supplied to the brake assemblies 36 and thereby regulate wheel slip. The modulation module 114 may generate $ABS_{Cntrl}$ by known methods used for anti-lock brake control. The modulation module 114 may also generate $ABS_{Cntrl}$ by known methods used for vehicle stability control. It will be appreciated that absent circumstances requiring brake pressure modulation to regulate wheel slip, the $ABS_{Cntrl}$ signal will regulate the ABS module 40 to supply brake apply pressure equal to the compensated brake pressure, $BF_{Comp}$.

In the foregoing manner, the PCM 16 and the brake control module 18 may work together to regulate the brake assemblies 36 based on the learned vehicle mass, $M_{Veh}$ and thereby provide mass-compensated brake assistance. More specifically, the PCM 16 and brake control module 48 may work together to selectively adjust the brake torque generated by the brake system 14 in proportion to $M_{Veh}$.

Figure 3:
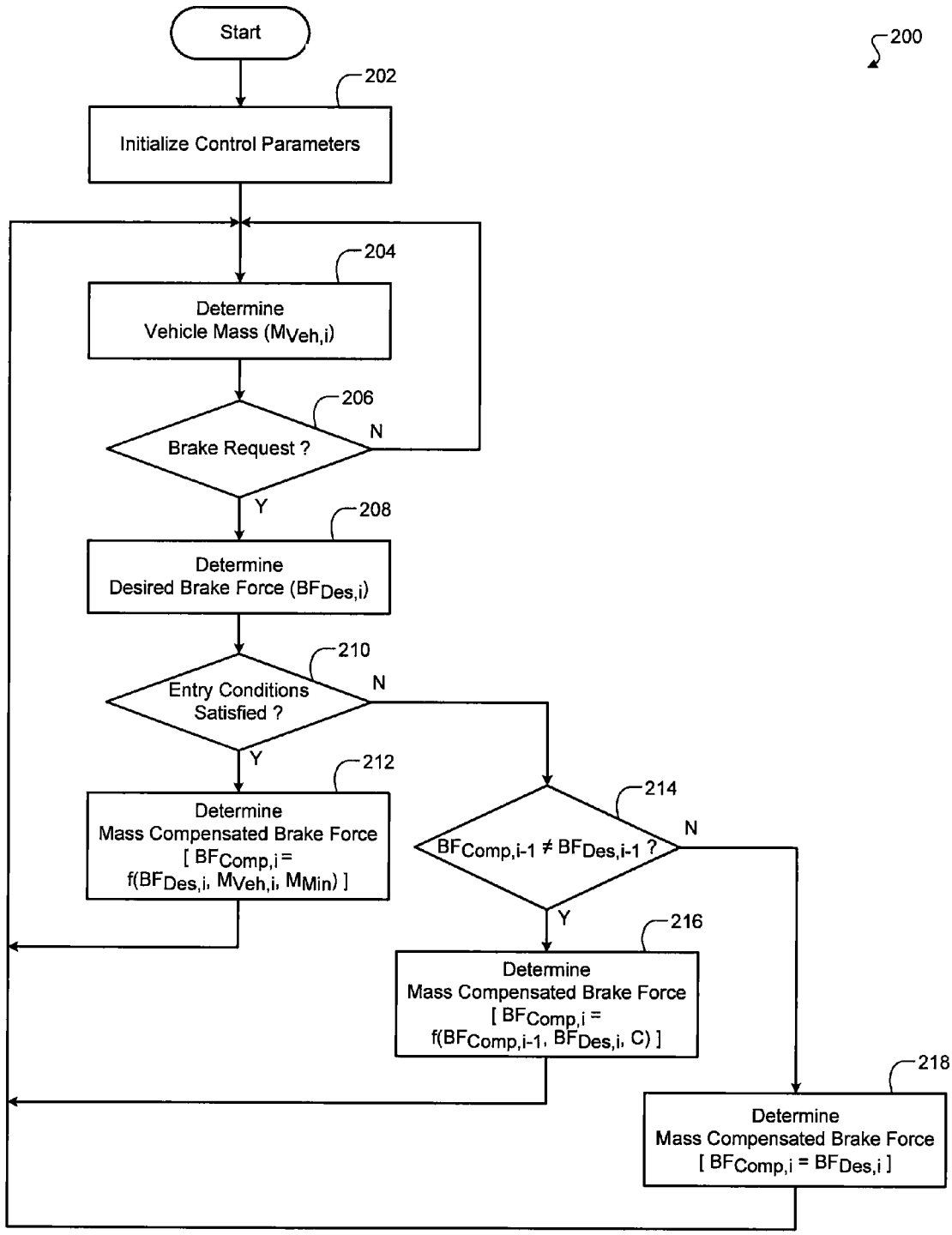
FIG. 3 is a flow diagram illustrating exemplary steps for a brake control method according to the principles of the present disclosure.

With particular reference to FIG. 3, exemplary control steps for providing mass-compensated braking assistance are shown and will now be described. The control method 200 may be implemented with the vehicle system 10, and more particularly, with the PCM 16 and brake control module 18 previously described herein. Thus, for brevity, the control method 200 will be described with reference to those elements of the vehicle system 10 previously described herein.

The control method 200 may be run periodically during operation of the vehicle system 10. Control begins in step 202 where control initializes control parameters used by the method 200. The control parameters include $M_{Min}$, $M_{Veh}$, $BF_{Des}$, and $BF_{Comp}$ and may include other control parameters as may be desired. In general, control initializes the control parameters to ensure an initial default mode of brake operation. The default mode of brake operation may inhibit mass-compensated brake assistance. Accordingly, in step 202, control may set $M_{Min}$, $BF_{Des}$, and $BF_{Comp}$ to default values stored in memory. Additionally, control may set $M_{Veh}$ equal to $M_{Min}$.

Control continues in step 204 where control determines a current value for the learned vehicle mass ($M_{Veh,i}$) for use in the current control loop. As previously discussed herein, control may determine $M_{Veh,i}$ using any known methods. Moreover, the value of $M_{Veh,i}$ determined in step 204 of the current control loop may vary from the value of $M_{Veh,i}$ determined in a prior control loop (e.g., $M_{Veh,i-1}$) based on recursive calculations of $M_{Veh,i}$. In this manner, the current value of $M_{Veh,i}$ may represent a learned value based on recursive calculations made by the control method 200.

Control proceeds in step 206 where control determines whether the driver is currently requesting braking. If there is a current brake request, then control proceeds in step 208, otherwise control loops back and proceeds in step 204.

In step 208, control determines a current value for the driver intended brake force, $BF_{Des,i}$. The current value of $BF_{Des,i}$ may vary from previous values of $BF_{Des}$ (e.g., $BF_{Des,i-1}$ in previous control loop) due to differences in driver input to the brake pedal 52 between control loops.

In step 210, control determines whether entry conditions are satisfied. In general, the entry conditions will be satisfied where no diagnostic faults have been detected with the sensors and other signals used in the determination of $M_{Veh,i}$ in step 204 and $BF_{Des,i}$ in step 208. In other words, the entry conditions will generally be satisfied where there are no faults with the vehicle system 10 that may affect the integrity of the values of $M_{Veh,i}$ and $BF_{Des,i}$ determined in the current control loop. If the entry conditions are satisfied, then control proceeds in step 212, otherwise control continues in step 214.

In step 212, control determines a current value for the compensated brake torque ($BF_{Comp,i}$) based on $BF_{Des,i}$, $M_{Veh,i}$, and $M_{Min}$. Control may use one of equations 1a and 2 as previously described to determine $BF_{Comp,i}$. Alternatively, control may use equations 1b and 2 as previously described where it is desired to adjust $BF_{Comp,i}$ to compensate for other deceleration forces generated by the vehicle system 10. As an another alternative, control may use equations 1c and 2 as previously described where it is desired to gradually introduce mass-compensated braking assistance. From step 212, control loops back as shown and proceeds in step 204 to begin another control loop of the method 200.

In step 214, control determines whether mass-compensated braking assistance was provided in the previous control loop. Accordingly, in step 214, control determines whether, in the previous control loop, the value of $BF_{Comp,i-1}$ was equal to the value of $BF_{Des,i-1}$. If $BF_{Comp,i-1}$ is not equal to $BF_{Des,i-1}$, then control proceeds in step 216, otherwise control proceeds in step 218.

In step 216, control determines a current value of the compensated brake force ($BF_{Comp,i}$) using the following formula: $BF_{Comp,i} = BF_{Comp,i-1}*(c) + BF_{Des,i}*(1-c)$ [equation 3], where c is a real numerical value that varies between zero and one (i.e. $0.0 \leq q \leq 1.0$). Control uses equation 3 to avoid an abrupt change in the current value of the mass-compensated brake force, $BF_{Comp,i}$, that may otherwise result where the entry conditions failed to be met in step 210 and mass-compensated braking assistance was provided in the previous control loop.

In step 216, control may determine the value of c in the current loop based on the value of c in the previous loop. Control may determine the value of c in this manner in order to vary the value of c from one to zero over successive control loops in step 216. In the foregoing manner, control may gradually decrease the amount of mass-compensated braking assistance from $BF_{Comp,i-1}$ to the current value of the driver intended brake force, $BF_{Des,i}$. From step 216, control loops back as shown and proceeds in step 204 to begin another control loop of the method 200.

In step 218, control sets a current value of the compensated brake force ($BF_{Comp,i}$) equal to the current value of the driver intended brake force, $BF_{Des,i}$. Control sets $BF_{Comp,i}$ equal to $BF_{Des,i}$ to inhibit mass-compensated braking assistance in step 218 where the entry conditions failed to be met in step 210 and braking assistance was not previously provided during the previous control loop as determined in step 214. It will be appreciated that in step 218, control may use equation 1c to determine $BF_{Des,i}$ by setting q equal to one in equation 1c. From step 218, control loops back as shown and proceeds in step 204 to begin another control loop of the method 200.

From the foregoing, it will be appreciated that the control method 200 may provide braking assistance based on the learned vehicle mass, $M_{Veh}$. More specifically, the control method 200 may selectively adjust the brake torque generated by the brake system 14 in proportion to $M_{Veh}$. It will also be appreciated that the control method 200 may sustain braking assistance during a braking event where the current value of $M_{Veh}$ becomes unreliable during the braking event.

Those skilled in the art can now appreciate from the foregoing description that the broad teachings of the disclosure can be implemented in a variety of forms. For example, while a brake-by-wire brake system 14 is shown in the figures and described herein, it will be appreciated that the principles of the present disclosure may be implemented in conventional mechanical brake systems. Additionally, while the examples discussed herein use a learned vehicle mass, an estimated vehicle mass input by the driver of the vehicle through a driver interface device may be used to determine the amount of mass-compensated braking assistance. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle brake, comprising:
a compensation module that determines a compensated brake value based on a vehicle mass and at least one of a pedal force and a pedal displacement; and
a brake control module that selectively adjusts fluid pressure supplied to said vehicle brake based on said compensated brake value,
wherein said compensation module determines said compensated brake value based on a comparison of said vehicle mass and a predetermined mass value, and
wherein when said vehicle mass is greater than said predetermined mass value, said brake control module adjusts said fluid pressure in proportion to a quotient of said vehicle mass and said predetermined mass value.

2. A control system for a vehicle brake, comprising:
a compensation module that determines a compensated brake value based on a vehicle mass and at least one of a pedal force and a pedal displacement; and
a brake control module that selectively adjusts fluid pressure supplied to said vehicle brake based on said compensated brake value,
wherein said compensation module determines said compensated brake value based on a negative drive torque produced by a powerplant.

3. A control system for a vehicle brake, comprising:
a compensation module that determines a compensated brake value based on a vehicle mass and at least one of a pedal force and a pedal displacement;
a brake control module that selectively adjusts fluid pressure supplied to said vehicle brake based on said compensated brake value; and
an actuator that selectively supplies an actuation force to a master cylinder that generates said fluid pressure in response to said actuation force, wherein said brake control module adjusts said actuation force.

4. A control system for a vehicle brake, comprising:
a compensation module that determines a compensated brake value based on a vehicle mass and at least one of a pedal force and a pedal displacement;
a brake control module that selectively adjusts fluid pressure supplied to said vehicle brake based on said compensated brake value;
a brake pedal mechanically coupled to a master cylinder, said brake pedal selectively operable to supply said pedal force to said master cylinder; and
an actuator that supplies an actuation force to said master cylinder, wherein said master cylinder generates said fluid pressure in response to said pedal force and said actuation force, wherein said brake control module adjusts said actuation force.

5. A method for controlling a vehicle brake, comprising:
determining a compensated brake value based on a vehicle mass and at least one of a pedal force and a pedal displacement; and
selectively adjusting a fluid pressure supplied to said vehicle brake based on said compensated brake value,
wherein said determining said compensated brake value includes comparing said vehicle mass and a predetermined mass value, and wherein when said vehicle mass is greater than said predetermined mass value, said selectively adjusting said fluid pressure includes increasing said fluid pressure in proportion to a quotient of said vehicle mass and said predetermined mass value.

6. A method for controlling a vehicle brake, comprising:
determining a compensated brake value based on a vehicle mass and at least one of a pedal force and a pedal displacement; and
selectively adjusting a fluid pressure supplied to said vehicle brake based on said compensated brake value,
wherein said determining said compensated brake value includes determining said compensated brake value based on a negative drive torque produced by a powerplant.

7. A method for controlling a vehicle brake, comprising:
determining a compensated brake value based on a vehicle mass and at least one of a pedal force and a pedal displacement;
selectively adjusting a fluid pressure supplied to said vehicle brake based on said compensated brake value; and
providing an actuator that selectively supplies an actuation force to a master cylinder that generates said fluid pressure in response to said actuation force, wherein said selectively adjusting said fluid pressure includes adjusting said actuation force.

8. A method for controlling a vehicle brake, comprising:
determining a compensated brake value based on a vehicle mass and at least one of a pedal force and a pedal displacement;
selectively adjusting a fluid pressure supplied to said vehicle brake based on said compensated brake value;
providing a brake pedal mechanically coupled to a master cylinder, said brake pedal selectively operable to supply said pedal force to said master cylinder; and
providing an actuator that supplies an actuation force to said master cylinder, wherein said master cylinder generates said fluid pressure in response to said pedal force and said actuation force, wherein said selectively adjusting said fluid pressure includes adjusting said actuation force.

* * * * *